Oct. 1, 1968 A. HELLER 3,404,351
NEODYMIUM DOPED DEUTERIUM OXIDE LASER
Filed June 24, 1964
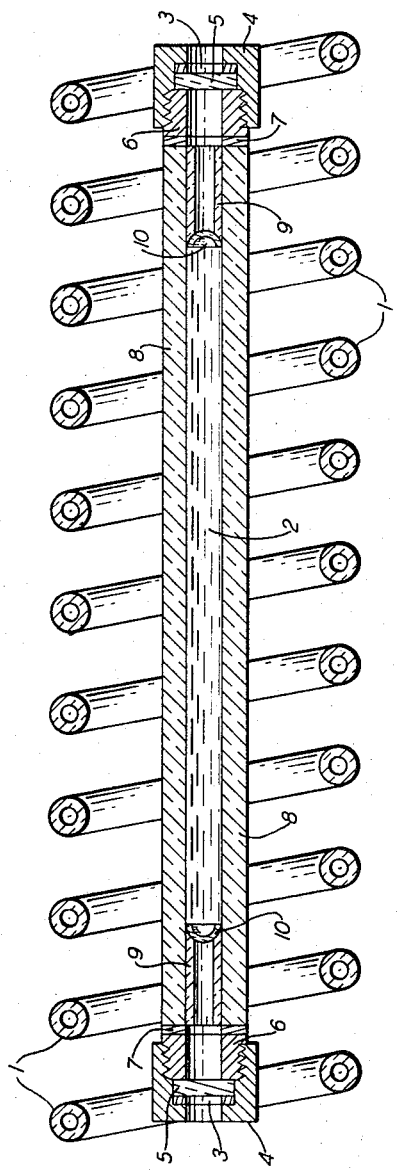
INVENTOR
*A. HELLER*
BY
ATTORNEY

United States Patent Office 3,404,351
Patented Oct. 1, 1968

3,404,351
NEODYMIUM DOPED DEUTERIUM
OXIDE LASER
Adam Heller, Summit, N.J., assignor to Bell Telephone
Laboratories, Incorporated, New York, N.Y., a corporation of New York
Filed June 24, 1964, Ser. No. 377,737
2 Claims. (Cl. 331—94.5)

This invention relates to laser devices which utilize, as the active negative temperature material, an unusually effective liquid medium. Specifically, the novel active material is trivalent neodymium in deuterium oxide.

Various liquid laser systems have been reported in the prior art. The liquid materials which have thus far been found to operate successfully are chelate compounds such as those described in A. Lempicki and H. Samelson, Appl. Phys. Letters 4, 133 (1963), and E. J. Schimitschek, Appl. Phys. Letters 3, 117 (1963). However, such liquids are not sufficiently stable to withstand the energy required to pump them without undergoing thermal decomposition.

A liquid system has now been discovered in which stimulated emission has been observed which is unusually attractive from the standpoints of simplicity, stability and output power. This novel system is neodymium as the active laser ion in a host material of heavy water or deuterium oxide.

Neodymium in deuterium oxide has strong absorptions at 3505 A., 5210 A., 5750 A., 7315 A., 7345 A., 7395 A., 7890 A., 8010 A. and 8650 A. Several other weak bands have been measured.

Stimulated emission in this material occurs at room temperature with modest pump energy at a frequency of 10,700 A.

The preferred concentration of trivalent neodymium is defined by the range 1% to 8% by weight. Neodymium chloride is an appropriate solute, however, any soluble neodymium salt may be effectively used within the limits prescribed.

The use of deuterium oxide as a solvent is particularly desirable since its heat transfer coefficient is considerably higher than solvents previously proposed. Furthermore, the variation in refractive index as a function of temperature is unusually low. This latter property is exceedingly important in obtaining coherent oscillations. It is a common deficiency of other solvents that sizable variations in refractive index are produced as the result of nonuniform absorption of the pump radiation. These large inhomogeneties in refractive index prevent laser action. In heavy water, even where the absorption is not made uniform, such inhomogenieties do not occur.

These and other aspects of the invention will become apparent from a consideration of the drawing in which:

The figure is a front section of a laser apparatus useful in combination with the active negative temperature liquid material according to this invention.

In the figure a series of flashlamp coils 1 are circumferentially disposed around the active laser material which is contained in the tube indicated generally at 8. The flashlamps used to obtain the data reported herein were G.E. FT524 lamps which are high pressure xenon lamps. Other pumping arrangements are available in the prior art and since neodymium has several strong absorption peaks over a broad band, a variety of pump sources are adaptable to this material.

The tube 8 consists of a precision bore capillary tube which has an outside diameter of ¼-inch and an inside diameter of $40/1000$ inch. Contained within the tube is a solution 2 of a soluble neodymium salt, such as anhydrous neodymium chloride, in deuterium oxide. The deuterium oxide may be diluted to some extent with water or other impurities. The results reported here were obtained with $D_2O$ of 99.7% purity. The liquid is contained in the tube with the aid of precision capillary plungers 9 which are closely fitted to the inside diameter of the tube. The surface of each of the plungers in contact with the liquid medium is faced with a mirror 10, both of which are arranged to be confocal in the manner described in U.S. Patent No. 3,055,257 issued Sept. 25, 1962. The radius of curvature of the mirrors is 5 cm. The reflecting surface may be silver, gold, dielectric or other appropriate surface of high reflectivity.

The ends of the tube are fitted with cylindrical threaded brass plugs affixed to each end with epoxy cement. Enclosing the terminal openings of the tube are quartz windows 5. The windows are held in place by Teflon rings 3 seated in screw caps 4.

Radiation emitted from the laser cavity defined by the mirrors 10 exits through the quartz windows 5 (or the one of them having the lowest reflectivity according to the conventional arrangement) is detected by a phototube, and the oscillations displayed on an associated CRO.

Using a 0.53 molar solution of anhydrous neodymium chloride in 99.7% $D_2O$ as the active liquid medium 2, coherent oscillations were measured at $1.07\mu$. The threshold power was 600 joules.

These and other aspects of the invention will become apparent to those skilled in the art. All such variations and deviations which basically rely on the teachings through which this invention has advanced the art are properly considered within the spirit and scope of this invention.

What is claimed is:
1. A liquid laser device comprising an active medium consisting of 1% to 13% of trivalent neodymium in liquid deuterium oxide, a source of light radiation incident on said active medium for pumping the trivalent neodymium.
2. An active liquid laser medium consisting essentially of the composition 1% to 8% trivalent neodymium in liquid deuterium oxide.

No references cited.

JEWELL H. PEDERSEN, *Primary Examiner.*

R. L. WIBERT, *Assistant Examiner.*